US012579208B1

(12) United States Patent
Woszczyna et al.

(10) Patent No.: US 12,579,208 B1
(45) Date of Patent: Mar. 17, 2026

(54) INDUSTRIAL AUTOMATION GENERATIVE ARTIFICIAL INTELLIGENCE ASSISTANCE INTERFACE WITH INTEGRATED ORGANIZATION CAPABILITIES

(71) Applicant: Rockwell Automation Technologies, Inc., Mayfield Heights, OH (US)

(72) Inventors: Patryk Woszczyna, Cracow (PL); Jonathan A. Mills, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 18/948,053

(22) Filed: Nov. 14, 2024

(51) Int. Cl.
*G06F 16/9538* (2019.01)
*G06F 16/93* (2019.01)

(52) U.S. Cl.
CPC .......... *G06F 16/9538* (2019.01); *G06F 16/93* (2019.01)

(58) Field of Classification Search
CPC . G06F 16/9538; G06F 16/93; G06F 16/90332
See application file for complete search history.

(56) References Cited

U.S. PATENT DOCUMENTS

2025/0138509 A1* 5/2025 Schoch ............. G06F 16/90332

OTHER PUBLICATIONS

How to Pin Chats in ChatGPT: A Step-by-Step Guide with ChatGPT Toolbox (Year: 2024).*

* cited by examiner

*Primary Examiner* — Hau H Hoang

(57) ABSTRACT

The disclosure describes an application service that leverages a general artificial intelligence (GAI) model to provide industrial assistance to users. The application service selects domains based on user queries and retrieves documentation from the selected domains. The application service generates prompts tasking the GAI model to respond to the user query, where the prompt includes the retrieved documentation. The application service then provides the generated responses to user devices for display. A user may pin a generated response in a user interface of the user device. In response, the application service instructs the user device to spotlight the response in the user interface.

20 Claims, 10 Drawing Sheets

START

RECEIVE USER QUERY                                      501

SELECT DOMAIN                                           503

RETRIEVE DOCUMENTATION                                 505

GENERATE ASSISTANCE PROMPT                             507

TRANSMIT RESPONSE FOR DISPLAY                          509

RECEIVE USER SELECTION TO PIN RESPONSE                 511

TRANSMIT INSTRUCTIONS TO SPOTLIGHT                     513

END

500

700a

<u>705</u>    PowerFlex 755TR capacitors fault    ...

I need some help with a fault on my
PowerFlex 755T.    <u>710</u>    3:34 PM

−750

−755

Hello!    <u>715</u>

I would be happy to help. Do you
have a fault identification or fault code
available?
3:34 PM It's a Fault 14112 − Capacitor Failure
<u>720</u>    3:34 PM

−725

Fault code F14112 on a PowerFlex
755T Low Harmonic or
Regenerative drive indicates a
Capacitor Failure. Here are 4
potential solutions of the problem:

1. Replacement of capacitors.
2. Checking CB1 (in the precharge
assembly).
3. Verifying the Health of the LCL
filter.
4. Firmware Update.

−750

−755

⚠ Safety Precaution

When converting fault 14112 to an
alarm, ensure steps 1-3 _llowed
else you risk catastrop__ __re. If an
LCL was replaced, the C__fault Your message    <u>760</u>    →

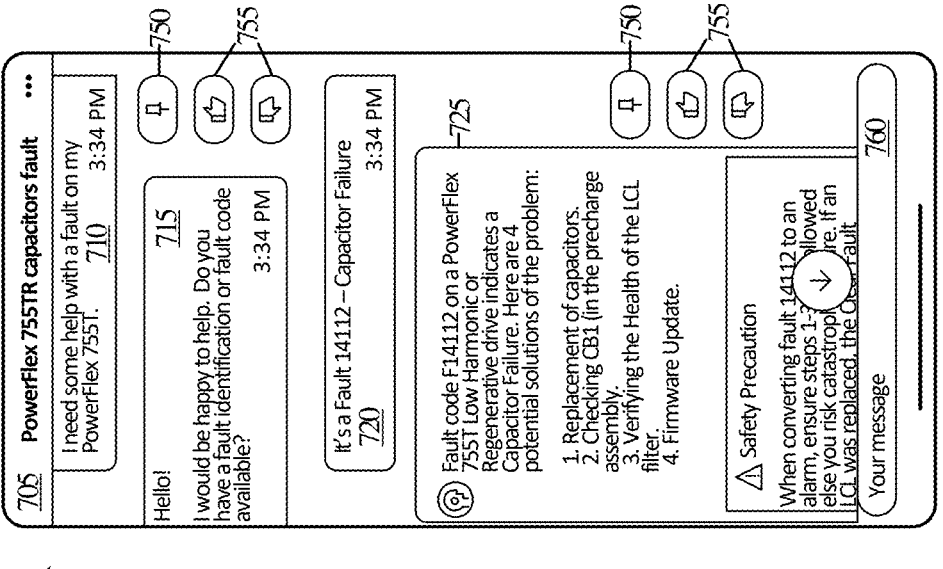

Fig. 7A

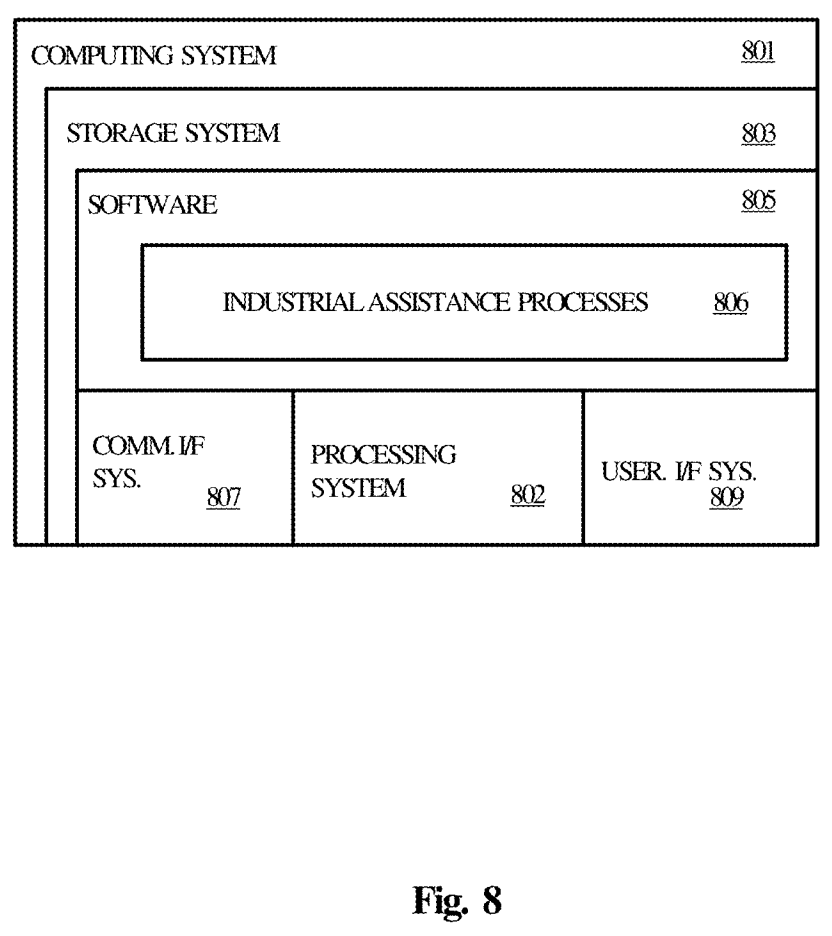

COMPUTING SYSTEM    801

STORAGE SYSTEM    803

SOFTWARE    805

INDUSTRIAL ASSISTANCE PROCESSES    806

USER. I/F SYS.    809

PROCESSING SYSTEM    802

COMM I/F SYS.    807

Fig. 8

INDUSTRIAL AUTOMATION GENERATIVE ARTIFICIAL INTELLIGENCE ASSISTANCE INTERFACE WITH INTEGRATED ORGANIZATION CAPABILITIES

CROSS-REFERENCE TO RELATED APPLICATIONS

This U.S. Patent Application is related to co-pending U.S. patent application Ser. No. 18/948,010, titled "GUIDED WORKFLOWS AND PREREQUISITE EXTRACTION FOR PERFORMING MAINTENANCE ON AUTOMATION DEVICES," filed concurrently, the contents of which are incorporated herein in their entirety for all purposes.

This U.S. Patent Application is related to co-pending U.S. patent application Ser. No. 18/948,100, titled "INDUSTRIAL ASSISTANCE PROMPT GENERATION WITH QR CODE DRIVEN DATA RETRIEVAL," filed concurrently, the contents of which are incorporated herein in their entirety for all purposes.

This U.S. Patent Application is related to co-pending U.S. patent application Ser. No. 18/948,130, titled "SYNTHESIZING DOMAIN-BASED RESPONSES IN INDUSTRIAL AUTOMATION SYSTEMS LEVERAGING GENERATIVE ARTIFICIAL INTELLIGENCE," filed concurrently, the contents of which are incorporated herein in their entirety for all purposes.

BACKGROUND

Industrial operators perform a wide variety of tasks to design, build, and maintain systems in industrial automation environments. These tasks often involve complex procedures that vary significantly based on the specific industrial automation device being used. To perform these tasks, operators typically consult detailed documentation that provides relevant procedures. However, given the extensive range of tasks and the diversity of devices, operators are faced with an overwhelming volume of documentation. Locating the precise information required for each task becomes a time-consuming and cumbersome process, reducing operational efficiency and productivity.

Furthermore, when industrial operators repeat a task performed in the past or consult previously accessed documentation, they often go through the same repetitive process of searching for the relevant information. This duplication of effort can lead to inefficiencies, especially when operators are under time constraints and need to resolve issues promptly.

SUMMARY

The disclosure describes an application service that leverages a general artificial intelligence (GAI) model to provide industrial assistance using an interface with integrated organization capabilities. In response to a user query, the application service submits an assistance prompt to the GAI model that tasks the model to respond to the user query, where the prompt includes documentation retrieved from a selected domain. A user on a user device may pin chatbot conversations and model-generated responses received from the application service, providing organization capabilities that allow the user to easily access these responses and conversations for future reference.

A computer-implemented method performed according to some implementations includes receiving, at the application service and from a user device, a user query requesting assistance in an industrial automation environment. The user query is submitted via a graphical user interface (GUI) of the user device. The method further includes selecting a domain from a plurality of domains based on the user query. Each of the plurality of domains is directed to a specific aspect of the industrial automation environment. The method further includes retrieving documentation from the selected domain. The method further includes generating an assistance prompt designed to elicit a response from a general artificial intelligence (GAI) model. The assistance prompt tasks the GAI model with generating a response to the user query. The assistance prompt includes the documentation. The method further includes transmitting the response to the user device for display via the GUI. The method further includes receiving, at the application service and from the user device, a user selection to pin the response. The method further includes transmitting, to the user device and in response to the user selection, instructions to spotlight the response in the GUI.

The method further includes maintaining a conversation history store associated with a user of the user device. The user query and the response are in a first conversation of the conversation history store. The method further includes storing the response as a pinned response of the first conversation in the conversation history store.

In some implementations, the response is a first response. The first conversation further includes a second response. The method further includes receiving a user selection to pin the second response. The method further includes prompting the user to confirm replacing the first response with the second response as the pinned response. The method further includes transmitting, to the user device in response to the user confirming replacement, instructions to spotlight the second response in the GUI.

In some implementations, the first conversation is one of a plurality of conversations associated with the user in the conversation history store. The method further includes receiving a user selection to pin the first conversation. The method further includes transmitting, to the user device in response to the user selection to pin the first conversation, instructions to display a list of the plurality of conversations in the GUI and to spotlight the first conversation in the list.

In some implementations, the method further includes storing at least the first conversation as one of a set of pinned conversations in the conversation history store. The method further includes deleting unpinned conversations from the conversation history store after the elapse of a predetermined time period since a last user interaction. The method further includes maintaining the set of pinned conversations in the conversation history store indefinitely.

In some implementations, the instructions to spotlight the first conversation include one or more of: instructions to reorder the list of the plurality of conversations, instructions to display a title of the first conversation in a banner, instructions to adjust a font of the title of the first conversation, and instructions to animate the title of the first conversation.

In some implementations, the instructions to spotlight the response include one or more of: instructions to display the response in a banner, instructions to highlight the response, instructions to adjust a font of the response, and instructions to animate the response.

These and other features and aspects of various examples may be understood in view of the following detailed discussion and accompanying drawings.

BRIEF DESCRIPTION OF THE DRAWINGS

FIGS. 7A-7C illustrate user interfaces in an implementation.

FIG. 8 illustrates a computing system suitable for implementing the various operational environments, architectures, environments, processes, scenarios, sequences, and frameworks discussed below with respect to the other Figures.

DETAILED DESCRIPTION

Figure 1:
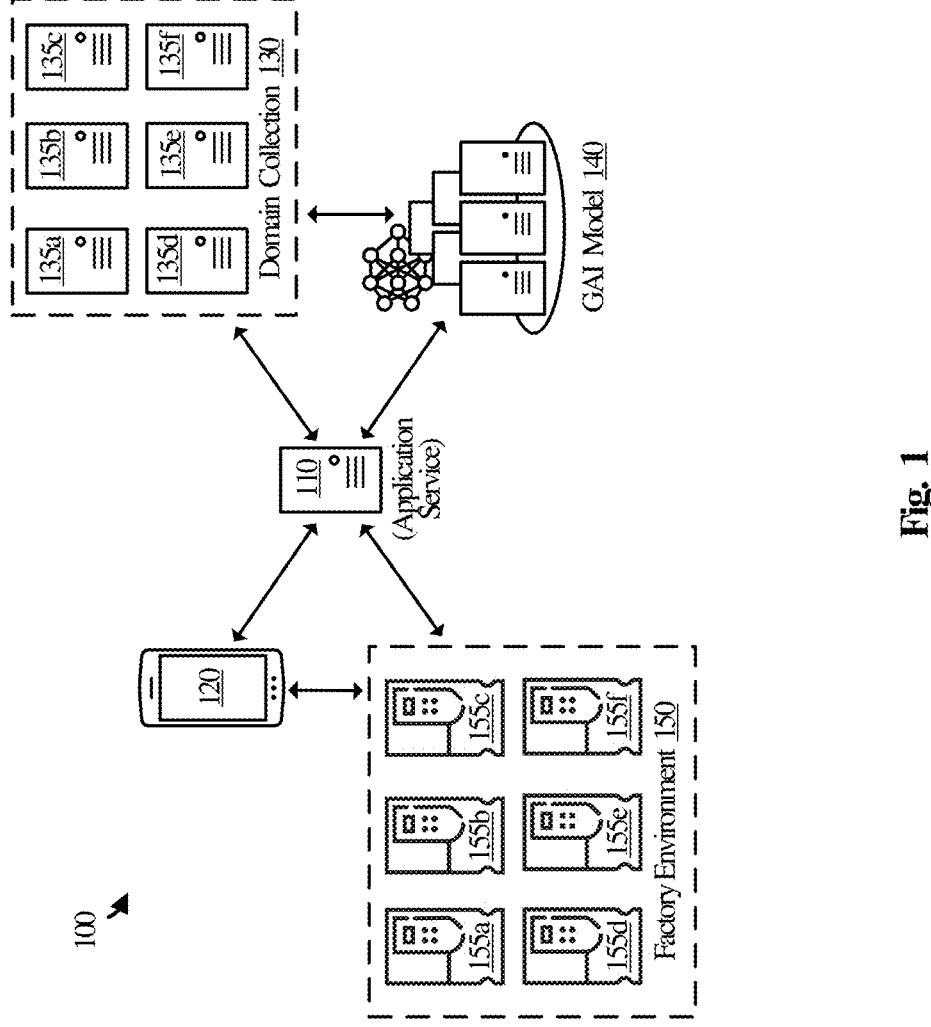
FIG. 1 illustrates an industrial automation environment in an implementation.

Industrial automation environments encompass a variety of resources that support operators in designing and maintaining systems. Design tools, such as Rockwell Advisor, help users select suitable components and design system layouts. Configuration tools, like Rockwell's Connected Components Workbench, assist in creating control programming for devices such as programmable logic controllers (PLCs). Monitoring tools, such as Rockwell's GuardianAI, detect anomalies within the automation environment. Additionally, each device model, for example, the PowerFlex 755T, comes with comprehensive documentation covering installation, troubleshooting, configuration, and more. This diverse array of tools and documentation reflects the complexity of industrial automation environments, which involve numerous device types and tasks.

The complexity of industrial automation environments can make it challenging for operators to find the most suitable resources for their needs. These environments may include many different types of devices, and any given device may have numerous documents within a knowledge base, requiring the operator to choose the appropriate document based on the task at hand. For example, a hardware wiring guide offers instructions for correct wiring, while a troubleshooting guide aids in identifying errors. This fragmented access to resources complicates the operators' efforts to efficiently build and maintain systems.

Artificial intelligence technology is increasingly being integrated into these various tools to enhance the assistance provided to users. For example, many tools may integrate chatbot features that leverage a large language model (LLM), to respond to natural-language queries submitted by users. Despite the versatility of LLMs, challenges arise when integrating them with industrial tools. With the wide range of tasks an operator may perform, an operator may interact with the LLM for different purposes, ranging from configuring a device to troubleshooting or reviewing past instructions. However, when information accessed through these interactions is not readily available for future reference, operators may find themselves repeating queries or searching through past communications, which reduces the efficiency and effectiveness of using such technology in fast-paced environments.

This disclosure describes an industrial automation environment designed to alleviate the aforementioned issues. This environment includes an application service that provides an interface with integrated organization capabilities. The application service leverages a general artificial intelligence (GAI model) and domains to respond to user-submitted queries. Domains, as defined here, are services configured to assist with specific aspects of the industrial environment. The automation environment may encompass multiple domains; for instance, each type of device can have an associated domain, and various tasks (such as generating industrial control logic) can also have associated domains.

Upon receiving a user-submitted query from a user device, the application service selects one or more domains that are most relevant to responding to the query. For example, if the query requests help installing a PowerFlex 755T, a domain associated with this device may be selected. Upon selecting the domain, the application service retrieves documentation from the selected domain. The application service generates an assistance prompt that includes the retrieved documentation and tasks the GAI model with responding to the user query. Once the model generates a response, the application service transmits it to the user device, where it is displayed in a conversational format. This interface supports multiple queries and responses, creating a conversation thread.

One particularly useful organization capability integrated into the interface provided by the application service is pinning capabilities. If the user chooses to pin a particular response within the conversation, the application service registers this selection and updates the user device's interface to spotlight the pinned response (e.g., by displaying it prominently at the top of the user interface). The application service also stores the entire conversation, including the pinned response, in a conversation history repository. When the user revisits a historical conversation, the previously pinned response is spotlighted in the user interface for quick reference. Additionally, the user has the option to pin entire conversations in some implementations. When a conversation is pinned, the application service saves it indefinitely, spotlighting it for easy access when the user views the conversation history.

The integrated organization capabilities allow the user to pin both individual responses and entire conversations, ensuring that critical information remains easily accessible without the need for repetitive queries or extensive searches through past conversations. This functionality streamlines workflows, particularly in fast-paced industrial environments where quick access to relevant guidance is crucial. Additionally, maintaining a structured conversation history with highlighted responses and pinned conversations allows operators to build a personalized knowledge base over time, leveraging previous interactions and reducing the effort required to find and reuse information. Additionally, industrial manufacturers can save resources by reducing the need for human assistance. Finally, compute resources are conserved by minimizing data storage redundancy, as related documentation is consolidated within domains rather than being distributed across various tools. Additionally, users will not have to submit repetitive queries, saving computing resources including bandwidth, processor cycles, and memory consumption on end user devices, at the cloud hosting level, and at the GAI system.

FIG. 1 illustrates industrial automation environment 100 in an implementation. Industrial automation environment 100 includes application service 110, user device 120, domain collection 130, GAI model 140, and factory environment 150. Application service 110 is in communication with user device 120, domain collection 130, GAI model 140, and factory environment 150. User device 120 is in communication with application service 110 and factory environment 150. Domain collection 130 is in communication with GAI model 140.

Application service 110 is a service for providing industrial assistance to users. Application service 110 may include software operating on one or more servers, which may be represented by computing system 801 of FIG. 8. In other implementations, application service 110 may be a cloud-based service. Application service 110 may be hosted by an industrial manufacturer in some implementations. Specifically, application service 110 may be provided to assist customers (e.g., a user on user device 120) in the execution of various tasks.

Application service 110 is configured to leverage GAI model 140 to enable users (e.g., on user device 120) to interact with a "chatbot" with which a user may submit queries and receive responses. Application service 110 receives these queries and prompts GAI model 140 to generate the responses, as described in greater detail herein. These queries may include requests for guided workflows for maintenance tasks, as well as natural language queries (e.g., "How do I install my PowerFlex 755T?").

In some implementations, application service 110 selects one or more domains 135 from domain collection 130 based on the submitted queries. Application service 110 may select the domains 135a-135f using various methods. For example, where the query is a request for a guided workflow, application service 110 may select a device-specific domain 135 based on a device-type identified in the request. In another scenario, application service 110 may make the selection based on a QR code scan by user device 120, as discussed in greater detail in relation to domain selection module 310 below. In other scenarios, application service 110 may select a domain 135 by prompting GAI model 140 to select one or more domains 135 based on the user-submitted query.

Where the query is a request for a guided workflow for maintenance tasks, application service 110 may retrieve device-specific documentation from a device-specific domain 135 to generate assistance prompts for GAI model 140. The assistance prompts task GAI model 140 with generating a list of steps for performing the maintenance, a list of prerequisites for performing the maintenance, and a list of safety precautions for performing the maintenance. Upon receiving a response from GAI model 140, application service 110 transmits the guided workflow information to user device 120 for display.

Figure 3:
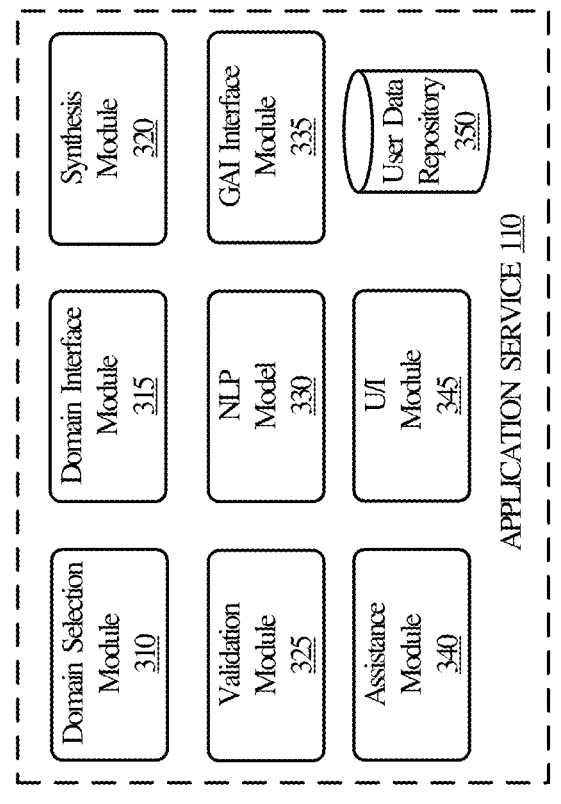
FIG. 3 illustrates an application service in an implementation.

Application service 110 is also configured to manage user data in a user data repository, such as user data repository 350 of FIG. 3. The user data may include a list of devices (e.g., industrial automation devices 155a-155f) that the user has interacted with. Application service 110 may also store historical conversations between the user and the chatbot. Application service may also store identifications of which conversations and responses have been pinned by the user on user device 120, as discussed in greater detail with respect to FIG. 3 below.

User device 120 is a device utilized by users in industrial automation environment 100 to obtain industrial assistance. User device 120 may be a cell phone, tablet, laptop, human interface module (HIM), personal computer, or any other device capable of interfacing with application service 110. User device 120 may be represented by computing system 801 in FIG. 8. While one user device 120 is shown in FIG. 1 for simplicity, industrial automation environment 100 may include many user devices 120, with multiple users interacting with application service 110.

User device 120 may run device applications that interact with application service 110. For example, device applications running on user device 120 may include a software application (i.e., software application 210 described below in the discussion of FIG. 2), in which a user may interact with a chatbot by submitting queries such as natural language requests and requests for guided workflows. In some implementations, application service 110 may be a web-based application allowing user access via a web-browser. In either case, the user may submit queries and view responses from application service 110 on a user interface of user device 120.

Domain collection 130 is representative of a collection of domains 135a, 135b, 135c, 135d, 135e, 135f (collectively, "domains 135") in industrial automation environment 100. While six domains 135 are shown in FIG. 1 for simplicity, it is noted that domain collection 130 may include any number of domains 135. Each domain 135 may include software operating on one or more servers, which may be represented by computing system 801 of FIG. 8.

Domains 135 are services configured to provide assistance with respect to specific aspects of the industrial automation environment 100. For example, each model of device (e.g., PowerFlex 755T) may have an associated domain 135 directed to that model. Some domains 135 may be customer-specific domains storing customer specific information (e.g., design preferences and customer-specific safety precautions). Various tasks (e.g., industrial control logic generation) may also have an associated domain 135. Accordingly, domain collection 130 as a whole is capable of providing aid in a wide range of needs that arise in industrial automation environment 100.

Domains 135 are configured to receive calls from application service 110. For device-specific domains, these calls may include requests for device-specific documentation (which application service 110 may use to generate assistance prompts requesting a guided workflow). To this end, device-specific domains 135 maintain a library (e.g., domain library 410 of FIG. 4) storing documentation associated with the device, including, for example, technical sheets, user manuals, and troubleshooting guides. In some implementations, domains 135 retrieve this documentation and provide it to application service 110 for prompt generation. In other implementations, domains 135 may themselves generate an assistance prompt requesting a guided workflow, as discussed in greater detail in the discussion of process 500 below.

Factory environment 150 is representative of an environment executing industrial processes (e.g., manufacturing, packaging, warehousing, etc.). Factory environment 150 includes a wide range of components for performing the industrial processes, including industrial automation industrial automation devices 155a, 155b, 155c, 155d, 155e, 155f (collectively "industrial automation industrial automation devices 155") illustrated in FIG. 1. While six industrial automation industrial automation devices 155 are shown in FIG. 1 for simplicity, industrial automation environment 100 may include any number of industrial automation industrial automation devices 155.

Industrial automation devices 155 are representative of various devices that may operate in factory environment 150, including, for example, variable frequency drives (VFDs), direct on line controllers, starters, PLCs, robotic devices, and the like. Operators (users) in factory environment 150 perform many tasks associated with industrial automation devices 155, including selecting the units, designing the system, configuring industrial automation industrial automation devices 155, and maintaining industrial automation devices 155. The users may, in some cases, perform various tasks by interacting with industrial automation devices 155 directly via user device 120. For example, users may configure and troubleshoot industrial automation devices 155 via user device 120 connected to the industrial automation devices 155 (e.g., via a Bluetooth connection, USB connection, near field communication (NFC), etc.).

Industrial automation devices 155 may have affixed QR codes. These QR codes may be affixed to industrial automation devices. For example, the QR code may be on a sticker or decal on the casing or packaging of industrial automation device 155, or may be visible in a screen of industrial automation device 155 (such as in a human interface module). These QR codes may encode information above the device such as catalog numbers, serial numbers, and device types. These QR codes may be scanned by user device 120 to obtain device-specific assistance, as explained further below. An exemplary QR code is represented in element 730 of user interface 700*b* in FIG. 7B.

GAI model 140 is an artificial intelligence model designed to process and generate natural language text. GAI model 140 may consist of a system of transformer-based neural networks with a vast number of parameters (weights and balances). It is trained on massive amounts of textual data, enabling it to generate relevant responses based on given prompts or input text. In some implementations, GAI model 140 may be fine-tuned using industrial data, such as product specifications and manuals. Alternatively, GAI model 140 may be a generically trained model that utilizes its general training, along with the context of the prompts, to provide assistance specifically tailored to the industrial automation environment 100. Depending on the implementation, GAI model 140 may be hosted and operated by a third party or by an industrial manufacturer, and it may run from cloud infrastructure or one or more data centers.

GAI model 140 is configured to receive prompts from application service 110 and domains 135. Prompts from application service 110 may include troubleshooting prompts requesting assistance for device-specific troubleshooting, domain selection prompts requesting GAI model 140 to identify appropriate domains 135 for responding to a user-submitted query, synthesization prompts requesting GAI model 140 to synthesize responses received from domains 135, and validation prompts requesting GAI model 140 to validate a synthesized response. These various prompts are described in greater detail in co-pending case U.S. patent application Ser. No. 18/948,130, titled "SYNTHESIZING DOMAIN-BASED RESPONSES IN INDUSTRIAL AUTOMATION SYSTEMS LEVERAGING GENERATIVE ARTIFICIAL INTELLIGENCE," incorporated by reference above.

Generative artificial intelligence (GAI) models (also sometimes known as foundation models) are models trained to generate new data based on a training dataset. GAI models as used herein include large-scale generative artificial intelligence (AI) models trained on massive quantities of diverse, unlabeled data. The GAI models learn using self-supervised, semi-supervised, or unsupervised techniques. GAI models perform many downstream tasks based on capturing general knowledge, semantic representations, and patterns and regularities in the training data. In some embodiments, such as embodiments included herein, a GAI model may be fine-tuned for specific downstream tasks. GAI models include BERT (Bidirectional Encoder Representations from Transformers) and ResNet (Residual Neural Network). GAI models may be based on any relevant architecture, including, for example, generative adversarial networks (GANs), variational auto-encoders (VAEs), and transformer models, including multimodal transformer models. Depending on the type of input accepted and output provided, GAI models may be multimodal or unimodal.

Multimodal models are a class of GAI model that accepts multimodal data including text, image, video, and audio data. Multimodal models may leverage techniques like attention mechanisms and shared encoders to fuse information from different modalities and create joint representations. Learning joint representations across different modalities enables multimodal models to generate multimodal outputs that are coherent, diverse, expressive, and contextually rich. For example, multimodal models can generate a caption or textual description of a given image by extracting visual features using an image encoder, then feeding the visual features to a language decoder to generate a descriptive caption. Similarly, multimodal models can generate an image based on a text description (or, in some scenarios, a spoken description transcribed by a speech-to-text engine). Multimodal models work in a similar fashion with video—generating a text description of the video or generating video based on a text description.

Multimodal models include visual-language foundation models, such as CLIP (Contrastive Language-Image Pre-training), ALIGN (A Large-scale ImaGe and Noisy-text embedding), and ViLBERT (Visual-and-Language BERT), for computer vision tasks. Examples of visual multimodal or foundation models include DALL-E, DALL-E 2, Flamingo, Florence, and NOOR. Types of multimodal models may be broadly classified as or include cross-modal models, multimodal fusion models, and audio-visual models, depending on the particular characteristics or usage of the model.

Large language models (LLMs) are a type of GAI model that process and generate natural language text. These models are trained on massive amounts of textual data. LLMs learn to generate relevant responses given a prompt or input text. The responses are coherent and contextually relevant to the given prompt. LLMs understand and generate sophisticated language based on their training. LLMs capture intricate patterns, semantics, and contextual dependencies in textual data. In some cases, LLMs may be used in multimodel models. For example, the LLM intelligence is used to combine images and audio input with textual input to generate multimodal output. Types of LLMs include language generation models, language understanding models, and transformer models.

Transformer models, including transformer-type foundation models and transformer-type LLMs, are a class of deep learning models used in natural language processing (NLP). Transformer models are based on a neural network architecture which uses self-attention mechanisms to process input data and capture contextual relationships between words in a sentence or text passage. Transformer models weigh the importance of different words in a sequence, allowing them to capture long-range dependencies and relationships between words. GPT (Generative Pre-trained Transformer) models, BERT (Bidirectional Encoder Representations from Transformer) models, ERNIE (Enhanced Representation through kNowledge IntEgration) models, T5 (Text-to-Text Transfer Transformer), and XLNet models are types of transformer models which have been pretrained on large amounts of text data using a self-supervised learning technique called masked language modeling. For example, large language models, such as ChatGPT and its brethren, have been pretrained on an immense amount of data across virtually every domain of the arts and sciences. This pre-training allows the models to learn a rich representation of language that can be fine-tuned for specific NLP tasks, such as text generation, language translation, or sentiment analysis. Moreover, these models have demonstrated emergent capabilities in generating responses that are creative, open-ended, and unpredictable.

It is noted that FIG. 1 illustrates an implementation that includes one GAI model 140. However, it is noted that in some implementations, industrial automation environment 100 may include multiple GAI models. For instance, one GAI model could handle requests from application service 110, while another GAI model (or several others) manages requests from domains 135.

Figure 2:
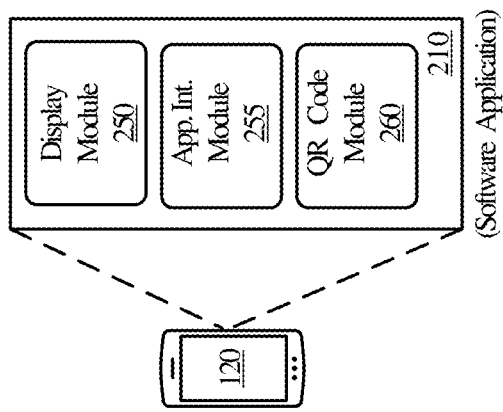
FIG. 2 illustrates a user device in an implementation.

FIG. 2 illustrates user device 120 in an implementation. User device 120 executes software application 210, which is representative of an industrial chatbot application that assists a user in various tasks such as device troubleshooting. Software application 210 may be stored in memory of user device 120 (represented for example by storage system 803 of FIG. 8) and executed by one or more processors (represented for example by processing system 802 of FIG. 8) of user device 120. Software application 210 provides a user interface in the display of user device 120, to provide users with device information and receive configuration selections. Software application 210 includes display module 250, application interface module 255, and QR code module 260, which are representative of elements of software application 210 performing the functions explained below.

Display module 250 is representative of a module configured to receive user inputs and provide information for display in a user interface. The display module 250 is designed to generate and present a user interface through which a user may interact with the system, including submitting queries to a chatbot (e.g., requests for guided workflows for troubleshooting and maintenance) and receiving responses. Example user interfaces provided by display module 250 are illustrated in FIGS. 7A-7D.

Application interface module 255 is configured to handle communication between user device 120 and application service 110. This module is responsible for transmitting user queries, requests, and any other data from user device 120 to the application service 110, as well as receiving responses, guided workflows, and other relevant information. Application interface module 255 ensures the smooth exchange of data, allowing the system to process user requests and return the necessary information to be displayed via display module 250.

QR code module 260 is configured to resolve scanned QR codes. This module enables the user device 120 to scan QR codes (using a camera on user device 120) located on industrial automation devices. The QR codes on these industrial automation devices 155 contain specific information such as device type, catalog numbers and serial numbers. Upon scanning, QR code module 260 decodes the information and sends it to application service 110, which may use the data for prompt generation, as discussed further below.

FIG. 3 illustrates a detailed view of application service 110. Application service 110 includes domain selection module 310, domain interface module 315, synthesis module 320, validation module 325, natural language processing (NLP) model 330, GAI interface module 335, assistance module 340, user interface (U/I) module 345, and user data repository 350. While these modules and elements are depicted to describe the generation of synthesized domain-based responses, the functionalities described may be incorporated into more or fewer components, software components, hardware components, firmware components, or a combination without departing from the scope and spirit of the present disclosure.

User interface (U/I) module 345 is a module configured to interface with user device 120. U/I module 345 receives user-submitted queries (e.g., request for guided workflows for performing maintenance) from user device 120 and provides responses to user device 120. U/I module 345 may also perform various other user interface functions, including receiving feedback from users and managing user authentication and continuity.

Domain selection module 310 is configured to select appropriate domains 135 for responding to user-submitted queries. Where a user query is a request for a guided workflow for performing maintenance, domain selection module 310 may select a device-specific domain 135 based on a type of device (e.g., "PowerFlex 755T) specified in the user request. In some implementations, domain selection module 310 may select domains based on device information obtained from user device 120 by scanning a QR code on industrial automation device 155. Domain selection module 310 may also use other techniques for selecting domains, such as leveraging GAI model 140.

Domain interface module 315 is configured to interface with domains 135. In some implementations, domain interface module 315 interfaces with domains 135 (selected by domain selection module 310) to obtain documentation for assistance prompts requesting guided workflows from GAI model 140. Specifically, domain interface module 315 submits requests for the documentation to domains 135 and receives the documentation from domains 135. This documentation may include device-specific documentation obtained from device-specific domains 135, and customer-specific documentation retrieved from customer-specific domains 135. This documentation provides contextual information in assistance prompts generated by assistance module 340 discussed below.

Assistance module 340 is configured to generate an assistance prompt for GAI model 140. These assistance prompts may be generated in response to user queries requesting assistance installing industrial automation devices 155, configuring industrial automation devices 155, and performing maintenance on industrial automation devices 155, among other tasks. In some implementations, these assistance prompts may request a guided maintenance and troubleshooting workflow. This assistance prompt may task GAI model 140 with generating a response to the user query. For example, when the user query is a request for a guided workflow, the assistance prompt tasks GAI model 140 with generating a list of prerequisites associated with performing the maintenance, a list of steps for performing the maintenance, and a list of safety precautions for the list of maintenance. The assistance prompt further includes the documentation obtained from domains 135 by domain interface module 315 (as discussed above). Once assistance module 340 generates the assistance prompt, GAI interface module 335 submits the assistance prompt to GAI model 140, as described further below. During guided workflows, assistance module 340 may also track steps marked complete by users and auto-generates a maintenance report upon completion of all the steps.

GAI interface module 335 is a module configured to interface with GAI model 140. GAI interface module 335 performs preprocessing on prompts generated by other modules (e.g., assistance prompts generated by assistance module 340). After preprocessing, GAI interface module 335 submits the refined prompts to GAI model 140 for processing. Once GAI model 140 generates responses, GAI interface module 335 receives these responses and conducts an initial validation, which includes checking for syntax errors and ensuring the responses meet basic correctness criteria before passing them along for further operations.

User data repository 350 is representative of a data repository storing information about users of application service 110. User data repository 350 stores store details such as the user's name, position, organization, location, language preference, and historical conversations, including previously submitted queries and the responses generated for those queries. User data repository 350 may also maintain a list of devices for each user, including industrial automation device 155 that the user has interacted with. Additionally, the repository can store information across various users, capturing historical conversations, pinned chats, and pinned responses. This stored information allows the system to personalize user experiences further, tailor synthesized responses and incorporate conversational elements into responses. Furthermore, user data repository 350 tracks the steps marked complete in the list of steps during maintenance workflows.

Synthesis module 320 is configured to synthesize responses received from GAI model 140. The responses received from GAI model 140, as described herein, may be synthesized by synthesis module 320 before providing them to user device 120. For example, where GAI model 140 is prompted separately for general and user-specific prerequisites/safety precautions, synthesis module 320 may synthesize the different responses into a single response.

Validation module 325 is configured to validate the responses received from GAI model 140. Validation module 325 may orchestrate both general evaluation procedures and domain specific evaluation according to some embodiments.

Natural Language Processing (NLP) model 330 is a specialized model designed to process user-submitted natural language queries by analyzing the natural language within them. NLP model 330 may be utilized for domain selection according to some implementations (e.g., by identifying a device type in a natural-language query). Synthesis module 320, validation module 325, and NLP model 330 and various other elements are described in greater detail in co-pending case U.S. patent application Ser. No. 18/948, 130, titled "SYNTHESIZING DOMAIN-BASED RESPONSES IN INDUSTRIAL AUTOMATION SYSTEMS LEVERAGING GENERATIVE ARTIFICIAL INTELLIGENCE," incorporated by reference above.

Figure 4:
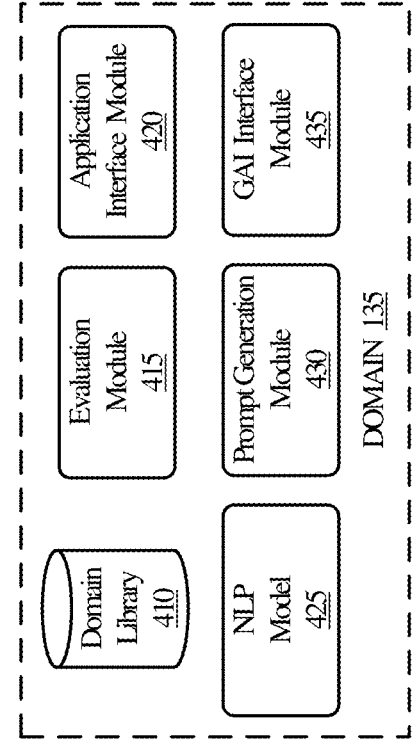
FIG. 4 illustrates a domain in an implementation.

FIG. 4 is a detailed view of domain 135, which is representative of each of domains 135a, 135b, 135c, 135d, 135e, 135f illustrated in FIG. 1. Domain 135 includes domain library 410, evaluation module 415, application interface module 420, NLP model 425, prompt generation module 430, and GAI interface module 435. While these modules and elements are depicted to describe the operation of domain 135, the functionalities described may be incorporated into more or fewer components, software components, hardware components, firmware components, or a combination without departing from the scope and spirit of the present disclosure.

Domain library 410 is representative of a repository storing documentation associated with each domain. For example, where domain 135 is a domain for an industrial automation device, domain library 410 may include technical sheets, programming manuals, troubleshooting guides, installation guides, and user training manuals for industrial automation device 155, among other types of documentation. Where domain 135 is a customer-specific domain, domain library 410 may include customer-specific safety documentation, and customer specific maintenance procedures, among other types of documentation. Documentation may be retrieved by application interface module 420 and provided to application service 110 in response to requests (e.g., where application service requests the documentation for generation of assistance prompts for guided workflow). In other implementations, prompt generation module 430 of domain 135 may itself utilize documentation from domain library 410 to generate assistance prompts, as discussed further below.

Application interface module 420 is a module configured to interface with application service 110. Application interface module 420 receives requests from application service 110 (e.g., requests for device-specific documentation or customer-specific safety documentation) and provides generated domain-specific responses (e.g., documentation retrieved from domain library 410 described above) to application service 110.

Prompt generation module 430 is a module configured to generate domain prompts to GAI model 140. It is noted that, while application service 110 may generate assistance prompts in some implementations (as described in FIG. 3 above), in other implementations domain 135 may itself generate and submit the assistance prompts. These assistance prompts may be substantially the same as the assistance prompt described above with respect to assistance module 340.

GAI interface module 435 is a module configured to interface with GAI model 140. GAI interface module 435 performs preprocessing on prompts generated by prompt generation module 430. After preprocessing, GAI interface module 435 submits the refined prompts to GAI model 140 for processing. Once GAI model 140 generates responses, GAI interface module 435 receives these responses and conducts an initial validation, which includes checking for syntax errors and ensuring the responses meet basic correctness criteria before passing them along for further operations. In implementations in which domains 135 generate assistance prompts, GAI interface module 435 submits the assistance prompts to GAI model 140 and receives the generated response. Application interface module 420 then provides the GAI-generated responses to application service 110.

Evaluation module 415 is a module configured to provide domain-specific evaluation procedures to application service 110. Evaluation module 415 may maintain descriptions of appropriate domain procedures that may be used by application service 110 to perform the domain-specific evaluation discussed above.

NLP model 425 is a model designed to process the domain-specific calls by analyzing the natural language within them. NLP model 425 may enable domain 135 to generate domain-specific responses to various types of requests from application service 110. NLP model 425, evaluation module 415, and various other elements are described in greater detail in co-pending application U.S. patent application Ser. No. 18/948,130, titled "SYNTHESIZING DOMAIN-BASED RESPONSES IN INDUSTRIAL AUTOMATION SYSTEMS LEVERAGING GENERATIVE ARTIFICIAL INTELLIGENCE," incorporated by reference above.

Figure 5:
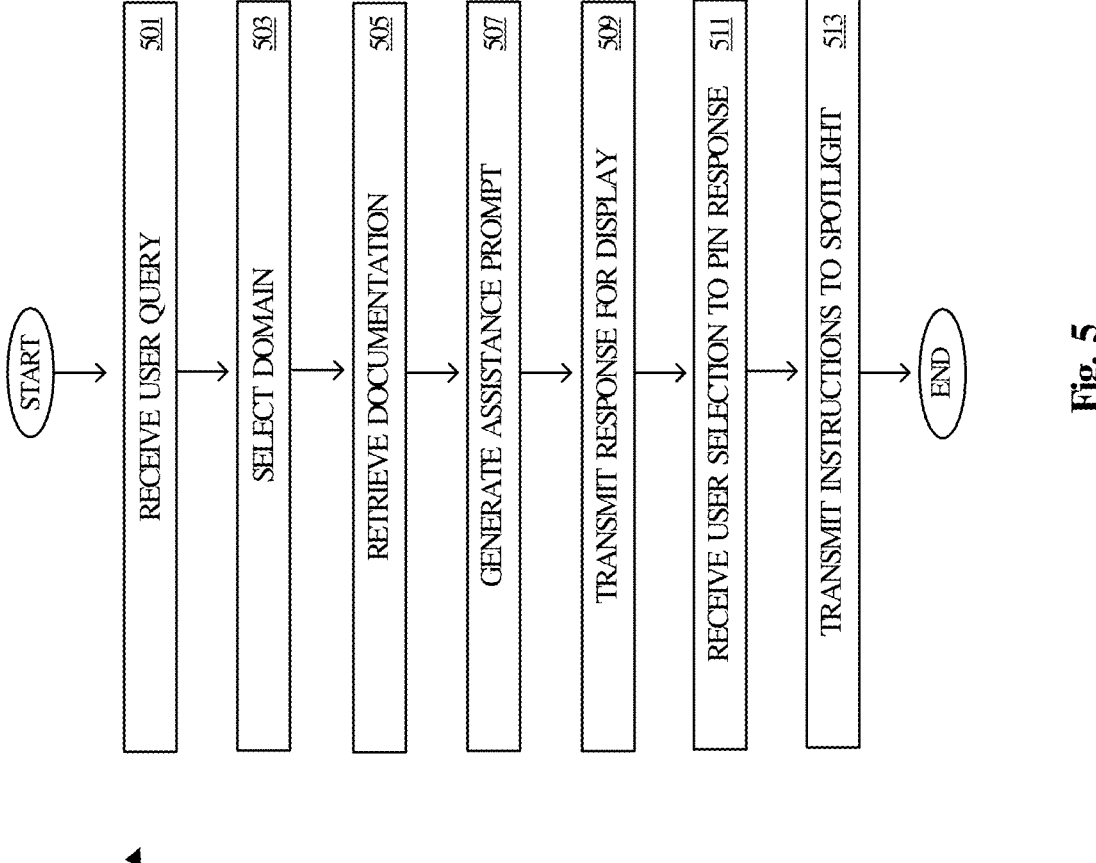
FIG. 5 illustrates a process for providing a domain-based industrial assistance interface in an implementation.

FIG. 5 illustrates an industrial assistance process, represented by process 500. Process 500 is employed by one or more computing devices, an example of which is provided by computing system 801 of FIG. 8. Process 500 may be implemented in program instructions (software and/or firmware) by one or more processors of the computing device. The program instructions direct the computing device to operate as follows, referring to the steps in FIG. 5.

Step 501 of process 500 is receiving a user query requesting assistance in industrial automation environment 100. Step 501 is performed by application service 110, and more specifically, by U/I module 345 of FIG. 3. The user query is submitted via a user interface of user device 120, such as user interfaces 700a, 700b of FIGS. 7A and 7B. The user may submit the user query by entering it into a text input field, as shown in element 760 of user interface 700a. In various implementations, the user may use other means to submit queries, such as voice input, selecting an option requesting assistance with a device, among other procedures.

Step 503 of process 500 is selecting a domain 135 from domain collection 130 based on the user query. Step 501 is performed by application service 110, and more specifically by domain selection module 310 of FIG. 3. As discussed above in relation to FIG. 1, each domain 135 is directed to a specific aspect of industrial automation environment 100. In step 501, application service 110 selects a domain 135 relevant to the user-submitted question (e.g., a device-specific domain 135 may be selected when the user-submitted query requests help installing a device).

Domain selection module 310 may leverage GAI model 140 to select the appropriate domains in some implementations. This includes generating a domain-selection prompt for GAI model 140, where the domain-selection prompt includes the user-submitted query (e.g., "What is the best device for controlling a CM103 AC motor?") and tasks GAI model 140 with selecting a domain 135 relevant to the query. Once domain selection module 310 generates the domain-selection prompt, GAI interface module 335 submits the prompt to GAI model 140 and receives a response from GAI model 140, where the response indicates a relevant domain 135.

In some scenarios, domain selection module 310 may use other techniques to perform domain selection. For example, domain selection module 310 may interface with NLP model 330 to identify appropriate domains. To this end, NLP model 330 is configured to identify certain keywords, which may resolve which domains are appropriate. As an example, a user-submitted query may reference a specific device (e.g., "How do I install my PowerFlex 755T"). In this case, NLP model 330 identifies the keyword "PowerFlex 755T," and domain selection module 310 selects the PowerFlex 755T based on this identification.

Step 505 of process 500 is retrieving documentation from the selected domain 135. Once domain 135 is selected, domain interface module 315 submits a request to the selected domain 135 for documentation relevant to responding to the user query (e.g., troubleshooting the "Heatsink Over Temperature" error). In response, domain 135 retrieves relevant documentation from domain library 410. The relevant documentation from a device-specific domain 135 may include at least a portion of one or more of: technical sheets, programming manuals, troubleshooting guides, installation guides, and user training manuals, among other types of documentation. The selected domains 135 provide this documentation to application service 110 for assistance prompt generation in some implementations. In other implementations, a selected domain 135 may itself generate assistance prompts, as discussed further below.

Step 507 of process 500 is generating an assistance prompt designed to elicit a response from GAI model 140. In some implementations, step 507 is performed by assistance module 340 of application service 110. Specifically, when application service 110 receives the documentation from domain 135, assistance module 340 generates an assistance prompt for GAI model 140. The assistance prompt tasks GAI model 140 with responding to the user query. The assistance prompt includes the documentation retrieved from the selected domains 135 (see step 507 above). Once the assistance prompt has been generated, GAI interface module 335 submits the prompt to GAI model 140.

In other implementations, step 507 is performed by prompt generation module 430 of the selected domain 135. After retrieving the documentation from domain library 410, prompt generation module 430 generates the assistance prompt described above, and GAI interface module 435 submits the assistance prompt to GAI model 140. Accordingly, either application service 110 or domains 135 may submit the prompt to GAI model 140 in various implementations.

Step 509 of process 500 is transmitting the response to user device 120 for display. Step 507 is performed by application service 110, and more specifically by U/I module 345. After application service 110 receives the generated response from GAI model 140, application service 110 transmits it to user device 120 for display. User device 120 then displays the model generated response in a graphical user interface, as shown for example in element 725 of user interface 700a of FIG. 7A.

Step 511 of process 500 is receiving a user selection to pin the response. Step 511 is performed by application service 110, and more specifically by U/I module 345. A user may elect to pin the response, for example by selecting element 750 of user interface 700a in FIG. 7A.

Figure 7B:
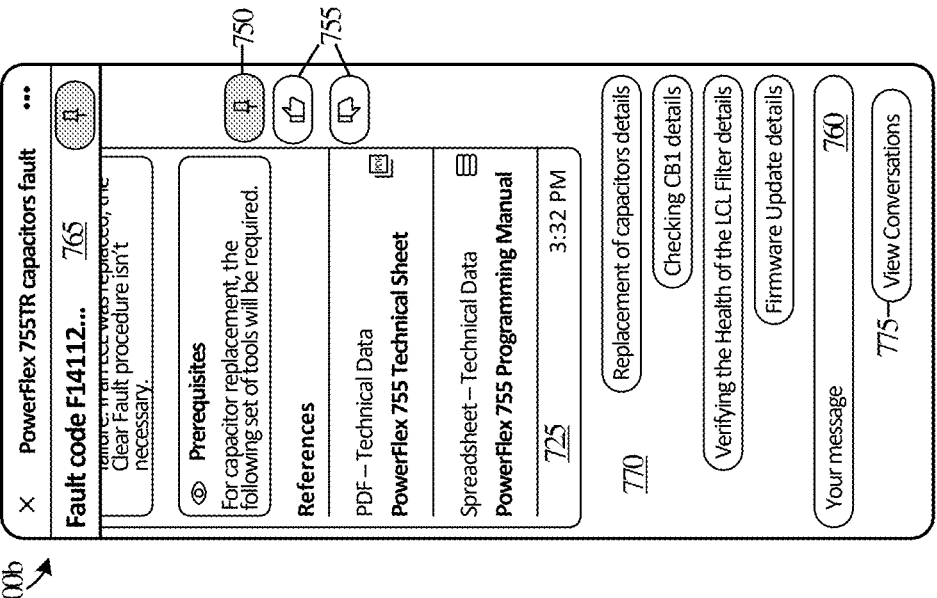

Step 513 or process 500 is transmitting instructions to spotlight the response in the user interface of user device 120. Step 511 is performed by application service 110, and more specifically by U/I module 345. These instructions may include one or more of: instructions to display the response in a prominent position, instructions to display the response in a banner, instructions to highlight the response, instructions to adjust a font of the response, and instructions to animate the response. FIG. 7B illustrates a pinned response (see element 765) where the beginning of the response is displayed in bold font in a banner at the top of user interface 700b in order to spotlight the response. Accordingly, a user may pin a response for a given conversation to have easy access to that response when viewing the conversation. For example, by tapping element 765 of FIG. 7B, user device 120 may automatically scroll the conversation in user interface 700b to the part of the conversation with the pinned response.

If a user exits out of a conversation and subsequently views the conversation again, the application service 110 transmits instructions to spotlight the pinned response in the manner discussed above, allowing the user to quickly identify a pinned response when opening a conversation. To this end, application service 110 (and in particular, assistance module 340) maintains a conversation history store associated with a user of the user device 120, noting that multiple such stores may be maintained for each user of application service 110. These conversation history stores may be maintained in user data repository 350 of FIG. 3. If a user requests to view historical conversations (for example, by selecting element 775 of user interface 700b in FIG. 7B), application service 110 transmits a list of the conversations for display (as shown in user interface 700c of FIG. 7C).

The user may pin a response for each of the conversations in their conversation history store. Accordingly, application service 110 maintains identifications of which responses are pinned responses in a user's conversation history store. In some implementations, application service 110 only allows one pinned response for each of the conversations. When a conversation has a pinned response and the user attempts to pin a different response, application service 110 prompts the user to confirm replacing the first response with the second response as the pinned response (for example, in a pop-up display in the user interface of user device 120). Upon confirmation from the user, application service 110 transmits, to user device 120, instructions to spotlight the newly pinned response in the user interface. It is noted that in other implementations, application service 110 may allow a user to pin multiple responses in a given conversation.

Figure 7C:
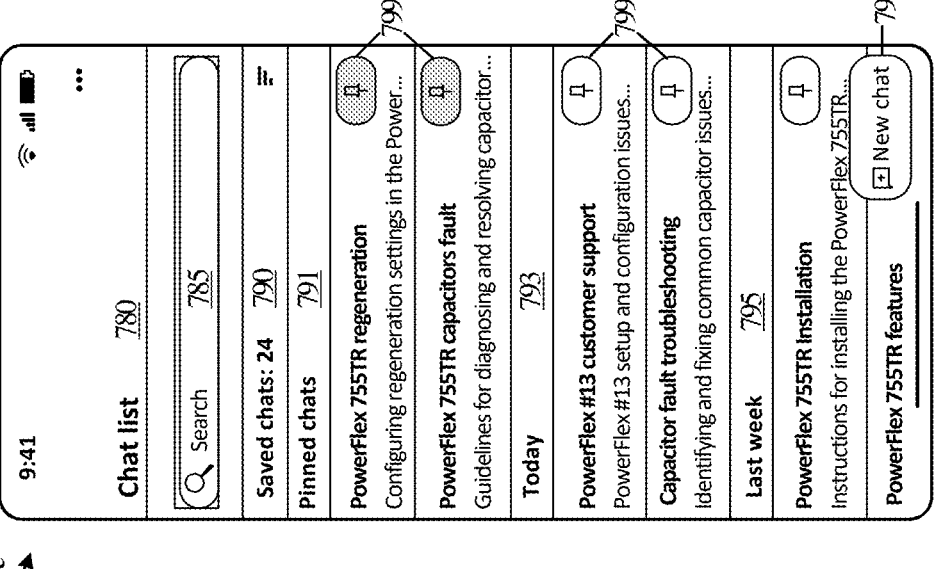

In addition to pinning responses, a user may pin entire conversations (e.g., by selecting elements 799 of user interface 700c in FIG. 7C). Application service 110 may allow users to pin multiple conversations, according to some implementations. When a user views the list of conversations (e.g., in user interface 700c of FIG. 7C), application service 110 transmits, to user device 120, instructions to spotlights the pinned conversations. The spotlighting of the pinned conversations may include one or more of: instructions to reorder the list of conversations, instructions to display a title of the first conversation in a banner, instructions to adjust a font of the title of the first conversation, and instructions to animate the title of the first conversation. User interface 700c of FIG. 7C illustrates an example in which the pinned conversations (see element 791) are displayed in a prominent position at the top of the list.

Application service 110 stores the pinned conversations and other historical conversations in the conversation history store, which may be in user data repository 350 of FIG. 3. Application service 110 may maintain the pinned responses in the conversation history store indefinitely, such that a user may prevent important or highly relevant conversations from being deleted. Application service 110 may delete unpinned conversations (e.g., in elements 793, 795 of user interface 700c of FIG. 7C) from the conversation history store after elapse of a predetermined time period (e.g., 1 month, 6 months, 1 year, etc.). This predetermined time period may be measured, for example, from the last time a user has submitted a query in the conversation or the last time a user has opened or otherwise interacted with the conversation. Accordingly, a user may pin conversations to prevent them from being deleted in some implementations.

Figure 6:
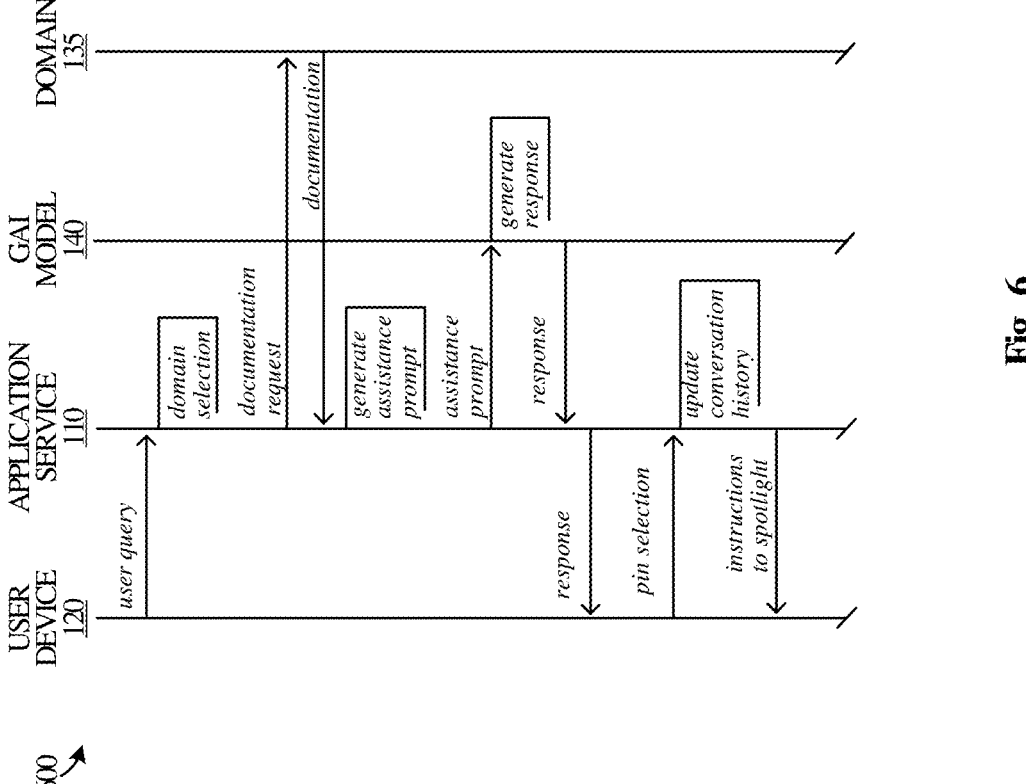
FIG. 6 illustrates an operational sequence in an implementation.

FIG. 6 illustrates an operational sequence of an application of process 500 in the context of industrial automation environment 100 in an implementation, represented by sequence 600. Sequence 600 includes user device 120, application service 110, GAI model 140, and domain 135.

In operational sequence 600, user device 120 submits a user query to application service 110, as discussed above with respect to step 501 of process 500. Application service selects domain 135 based on the user query, as discussed above with respect to step 503 of process 500. Application service 110 submits a documentation request to domain 135 and domain 135 provides the documentation to application service 110, as discussed above with respect to step 505 of process 500. Application service 110 generates an assistance prompt, as discussed above with respect to step 507 of process 500. Application service 110 submits the assistance prompt to GAI model 140. GAI model 140 generates a response and provides it to application service 110. Application service 110 transmits the response to user device 120 for display, a discussed above with respect to step 509 of process 500. User device 120 submits a pin selection to application service 110, indicating a user request to pin a response, as discussed above with respect to step 511 or process 500. Application service 110 updates the conversation history store (i.e., in user data repository 350) associated with the user to indicate that the response is pinned for the conversation. Application service 110 transmits, to user device 120, instructions to spotlight the pinned response, as discussed above with respect to step 513 of process 500.

FIGS. 7A-7C illustrate user interfaces 700a, 700b, 700c of user device 120 (of FIG. 1) with integrated organization capabilities. User interfaces 700a, 700b, 700c illustrate a sequence of GUIs displayed in a screen of user device 120 for a user performing maintenance on industrial automation device 155. It is noted that user interfaces 700a, 700b, 700c illustrate some examples; in other implementations user interfaces on user device 120 may have different arrangements, different elements, or additional or fewer elements. In some implementations, user interfaces 700a-700d may be displayed on a touchscreen of user device 120, allowing users to select elements by tapping. In other implementations, these interfaces may appear on other display types, where users can select elements using mouse or keyboard inputs.

FIG. 7A illustrates user interface 700a in an implementation. User interface 700a illustrates a particular conversation between a user and the chatbot provided by application service 110. Element 705 illustrates the title of the conversation (in this example "PowerFlex 755TR capacitors fault"). Elements 710, 720 illustrates user queries submitted by the user, which a user may submit via the text input field of element 760 (as discussed above with respect to step 501 of process 500). Elements 715, 720 illustrate responses generated by GAI model 140, as discussed above with respect to step 509 of process 500. Elements 755 illustrate feedback selections (illustrated by like and dislike options), which may be used as feedback for application service 110 (e.g., to provide developers with information about the performance of application service 110). Elements 750 illustrate a pin selection option a user may select to pin a specific response in the conversation.

FIG. 7B illustrates user interface 700b in an implementation. User interface 700b may be a continuation of the conversation from user interface 700a. In user interface 700b, the pin selection option of element 750 is shaded to indicate a user selection to pin the response of element 725. Element 765 illustrates a spotlight of the pinned response (i.e., the beginning of the response of element 725) in bold and in a banner at the top of user interface 700b. The spotlighting of pinned responses is discussed above with respect to step 513 of process 500. Element 770 illustrates selectable options for a user to get more information about various aspects of the response of element 725. Element 775 illustrates a user selection to view the user's conversation history.

FIG. 7C illustrates user interface 700c in an implementation. User interface 700c illustrates a conversation history for a user (from the conversation history store discussed above with respect to step 509 of process 500), which a user may navigate to, for example, by selecting element 775 of FIG. 7B. Element 780 illustrates a header identifying that the user is viewing the list of conversations ("Chat list") from their conversation history. Element 785 illustrates a search bar which a user may use to search for a specific conversation in the history. Element 790 indicates the number of saved conversations in the user's conversation history store. Element 791 illustrates the titles of conversations that have been pinned by the user, while elements 793, 795 illustrate the titles of unpinned conversations in chronological order (however, it is noted that in some implementations, both pinned and unpinned conversations may be presented in chronological order in elements 793, 795). Elements 799 illustrates pin selection options for a user to pin specific conversations. Elements 799 are shown as shaded for the pinned conversations of element 791, to indicate that the associated conversations have been pinned. These pinned conversations are spotlighted in user interface 700*c*, in this example by reordering of the conversations to display the conversations at the top of the list. A user may select one of the conversations in user interface 700*c* to view that conversation (as shown for example in user interfaces 700*a*, 700*b*). Element 797 illustrates a selectable option to start a new chat.

FIG. 8 illustrates a computing system 801 that is representative of any system or collection of systems in which the various processes, programs, services, and scenarios disclosed herein may be implemented. Examples of the computing system 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

The computing system 801 may be implemented as a single apparatus, system, or device or may be implemented in a distributed manner as multiple apparatuses, systems, or devices. The computing system 801 includes, but is not limited to, a processing system 802, a storage system 803, software 805, a communication interface system 807, and a user interface system 809. The processing system 802 is operatively coupled with the storage system 803, the communication interface system 807, and the user interface system 809.

The processing system 802 loads and executes software 805 from the storage system 803. The software 805 includes and implements the industrial assistance processes 806, which is (are) representative of the application service processes discussed with respect to the preceding figures, such as the process 500 of FIG. 5. When executed by the processing system 802, the software 805 directs the processing system 802 to operate as described herein for at least the various processes, operational scenarios, and sequences discussed in the foregoing implementations. The computing system 801 may optionally include additional devices, features, or functionality not discussed for purposes of brevity.

Referring still to FIG. 8, the processing system 802 may comprise a microprocessor and other circuitry that retrieves and executes the software 805 from the storage system 803. The processing system 802 may be implemented within a single processing device but may also be distributed across multiple processing devices or sub-systems that cooperate in executing program instructions. Examples of the processing system 802 include general purpose central processing units, graphical processing units, application specific processors, and logic devices, as well as any other type of processing device, combinations, or variations thereof.

The storage system 803 may comprise any computer-readable storage media device readable by the processing system 802 and capable of storing the software 805. The storage system 803 may include volatile and nonvolatile, removable, and non-removable media implemented in any method or technology for storage of information, such as computer readable software instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated or transitory signal.

In addition to computer-readable storage media, in some implementations the storage system 803 may also include computer readable communication media over which at least some of the software 805 may be communicated internally or externally. The storage system 803 may be implemented as a single storage device but may also be implemented across multiple storage devices or sub-systems co-located or distributed relative to each other. The storage system 803 may comprise additional elements, such as a controller, capable of communicating with the processing system 802 or possibly other systems.

The software 805 (including industrial assistance processes 806) may be implemented in program instructions and among other functions may, when executed by the processing system 802, direct the processing system 802 to operate as described with respect to the various operational scenarios, sequences, and processes illustrated herein. For example, software 805 may include program instructions for implementing an industrial assistance process as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method for operating an application service comprising:

receiving, at the application service and from a user device, a user query requesting assistance in an industrial automation environment, wherein the user query is submitted via a graphical user interface (GUI) of the user device;

selecting a domain from a plurality of domains based on the user query, wherein each of the plurality of domains is directed to a specific aspect of the industrial automation environment;

retrieving documentation from the selected domain;

generating an assistance prompt designed to elicit a response from a general artificial intelligence (GAI) model, wherein the assistance prompt tasks the GAI model with generating a response to the user query, and wherein the assistance prompt includes the documentation;

transmitting the response to the user device for display via the GUI;

receiving, at the application service and from the user device, a user selection to pin the response;

transmitting, to the user device and in response to the user selection, instructions to spotlight the response in the GUI;

maintaining a conversation history store associated with a user of the user device, wherein the user query and the response are in a first conversation of the conversation history store; and storing the response as a pinned response of the first conversation in the conversation history store.

2. The computer-implemented method of claim 1, wherein the user query is a guided workflow request and the response comprises:

a list of steps for performing maintenance in the industrial automation environment;

a list of prerequisites for performing maintenance in the industrial automation environment; and a list of safety precautions for performing maintenance in the industrial automation environment.

3. The computer-implemented method of claim 1, wherein the response is a first response, and wherein the first conversation further comprises a second response, the method further comprising:

receiving a user selection to pin the second response;

prompting the user to confirm replacing the first response with the second response as the pinned response; and transmitting, to the user device in response to the user confirming replacement, instructions to spotlight the second response in the GUI.

4. The computer-implemented method of claim 1, wherein the first conversation is one of a plurality of conversations associated with the user in the conversation history store, the method further comprising:

receiving a user selection to pin the first conversation; and transmitting, to the user device in response to the user selection to pin the first conversation, instructions to display a list of the plurality of conversations in the GUI and to spotlight the first conversation in the list.

5. The computer-implemented method of claim 4, further comprising:

storing at least the first conversation as one of a set of pinned conversations in the conversation history store;

deleting unpinned conversations from the conversation history store after elapse of a predetermined time period since a last user interaction; and maintaining the set of pinned conversations in the conversation history store indefinitely.

6. The computer-implemented method of claim 4, wherein the instructions to spotlight the first conversation comprise one or more of: instructions to reorder the list of the plurality of conversations, instructions to display a title of the first conversation in a banner, instructions to adjust a font of the title of the first conversation, and instructions to animate the title of the first conversation.

7. The computer-implemented method of claim 1, wherein the instructions to spotlight the response comprise one or more of: instructions to display the response in a prominent position, instructions to display the response in a banner, instructions to highlight the response, instructions to adjust a font of the response, and instructions to animate the response.

8. A system comprising:

one or more processors; and

one or more memories operably coupled to the one or
more processors and having stored thereon software
instructions that, upon execution by the one or more
processors, cause the one or more processors to:
receive, at an application service and from a user
device, a user query requesting assistance in an
industrial automation environment, wherein the user
query is submitted via a graphical user interface
(GUI) of the user device;
select a domain from a plurality of domains based on
the user query, wherein each of the plurality of
domains is directed to a specific aspect of the indus-
trial automation environment;
retrieve documentation from the selected domain;
generate an assistance prompt designed to elicit a
response from a general artificial intelligence (GAI)
model, wherein the assistance prompt tasks the GAI
model with generating a response to the user query,
and wherein the assistance prompt includes the docu-
mentation;
transmit the response to the user device for display via
the GUI;
receive, at the application service and from the user
device, a user selection to pin the response;
transmit, to the user device and in response to the user
selection, instructions to spotlight the response in the
GUI;
maintain a conversation history store associated with a
user of the user device, wherein the user query and
the response are in a first conversation of the con-
versation history store; and
store the response as a pinned response of the first
conversation in the conversation history store.
9. The system of claim 8, wherein the user query is a
guided workflow request and the response comprises:
a list of steps for performing maintenance in the industrial
automation environment;
a list of prerequisites for performing maintenance in the
industrial automation environment; and
a list of safety precautions for performing maintenance in
the industrial automation environment.
10. The system of claim 8, wherein the response is a first
response, and wherein the first conversation further com-
prises a second response, and wherein the instructions
comprise further instructions that, upon execution by the one
or more processors, cause the one or more processors to:
receive a user selection to pin the second response;
prompt the user to confirm replacing the first response
with the second response as the pinned response; and
transmit, to the user device in response to the user
confirming replacement, instructions to spotlight the
second response in the GUI.
11. The system of claim 8, wherein the first conversation
is one of a plurality of conversations associated with the user
in the conversation history store, and wherein the instruc-
tions comprise further instructions that, upon execution by
the one or more processors, cause the one or more proces-
sors to:
receive a user selection to pin the first conversation; and
transmit, to the user device in response to the user
selection to pin the first conversation, instructions to
display a list of the plurality of conversations in the
GUI and to spotlight the first conversation in the list.
12. The system of claim 11, wherein the instructions
comprise further instructions that, upon execution by the one
or more processors, cause the one or more processors to:

store at least the first conversation as one of a set of pinned
conversations in the conversation history store;
delete unpinned conversations from the conversation his-
tory store after elapse of a predetermined time period
since a last user interaction; and
maintain the set of pinned conversations in the conver-
sation history store indefinitely.
13. The system of claim 11, wherein the instructions to
spotlight the first conversation comprise one or more of:
instructions to reorder the list of the plurality of conversa-
tions, instructions to display a title of the first conversation
in a banner, instructions to adjust a font of the title of the first
conversation, and instructions to animate the title of the first
conversation.
14. The system of claim 8, wherein the instructions to
spotlight the response comprise one or more of: instructions
to display the response in a prominent position, instructions
to display the response in a banner, instructions to highlight
the response, instructions to adjust a font of the response,
and instructions to animate the response.
15. A computer-implemented method comprising:
submitting, by a user device to an application service, a
user query requesting assistance in an industrial auto-
mation environment, wherein the user query is submit-
ted via a graphical user interface (GUI) of the user
device;
selecting, by the application service, a domain from a
plurality of domains based on the user query, wherein
each of the plurality of domains is directed to a specific
aspect of the industrial automation environment;
retrieving, by the application service, documentation from
the selected domain;
generating, by the application service, an assistance
prompt designed to elicit a response from a general
artificial intelligence (GAI) model, wherein the assis-
tance prompt tasks the GAI model with generating a
response to the user query, and wherein the assistance
prompt includes the documentation;
transmitting, by the application service, the response to
the user device for display via the GUI;
displaying, by the user device, the response in the GUI;
submitting, by the user device to the application service,
a user selection to pin the response;
transmitting, to the user device and in response to the user
selection, instructions to spotlight the response in the
GUI;
spotlighting, by the user device, the response in the GUI;
maintaining, by the application service, a conversation
history store associated with a user of the user device,
wherein the user query and the response are in a first
conversation of the conversation history store; and
storing, by the application service, the response as a
pinned response of the first conversation in the con-
versation history store.
16. The computer-implemented method of claim 15,
wherein the user query is a guided workflow request and the
response comprises:
a list of steps for performing maintenance in the industrial
automation environment;
a list of prerequisites for performing maintenance in the
industrial automation environment; and
a list of safety precautions for performing maintenance in
the industrial automation environment.
17. The computer-implemented method of claim 15,
wherein the response is a first response, and wherein the first
conversation further comprises a second response, the
method further comprising:

submitting, by the user device and to the application service, a user selection to pin the second response;

prompting, by the application service, the user to confirm replacing the first response with the second response as the pinned response; and transmitting, by the application service and to the user device in response to the user confirming replacement, instructions to spotlight the second response in the GUI.

18. The computer-implemented method of claim 15, wherein the first conversation one of a plurality of conversations associated with the user in the conversation history store, the method further comprising:

receiving, by the application service, a user selection to pin the first conversation; and transmitting, by the application service and to the user device in response to the user selection to pin the first conversation, instructions to display a list of the plurality of conversations in the GUI and to spotlight the first conversation in the list.

19. The computer-implemented method of claim 18, further comprising:

storing, by the application service, at least the first conversation as one of a set of pinned conversations in the conversation history store;

deleting, by the application service, unpinned conversations from the conversation history store after elapse of a predetermined time period since a last user interaction; and maintaining, by the application service, the set of pinned conversations in the conversation history store indefinitely.

20. The computer-implemented method of claim 18, wherein the instructions to spotlight the first conversation comprise one or more of: instructions to reorder the list of the plurality of conversations, instructions to display a title of the first conversation in a banner, instructions to adjust a font of the title of the first conversation, and instructions to animate the title of the first conversation.

\* \* \* \* \*